(12) United States Patent
Wu et al.

(10) Patent No.: US 9,854,543 B2
(45) Date of Patent: *Dec. 26, 2017

(54) CARRIER AGGREGATION WITH POWER HEADROOM REPORT

(71) Applicant: Cellular Communications Equipment LLC, Plano, TX (US)

(72) Inventors: Chunli Wu, Beijing (CN); Benoist Pierre Sebire, Tokyo (JP)

(73) Assignee: CELLULAR COMMUNICATIONS EQUIPMENT LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,862

(22) Filed: May 9, 2016

(65) Prior Publication Data
US 2016/0255596 A1    Sep. 1, 2016

Related U.S. Application Data

(63) Continuation of application No. 14/678,870, filed on Apr. 3, 2015, now Pat. No. 9,351,262, which is a (Continued)

(51) Int. Cl.
*H04W 52/36* (2009.01)
*H04W 72/04* (2009.01)
(Continued)

(52) U.S. Cl.
CPC ......... *H04W 52/365* (2013.01); *H04L 1/1614* (2013.01); *H04W 72/04* (2013.01); (Continued)

(58) Field of Classification Search
CPC ............... H04W 52/365; H04W 72/04; H04W 72/0413; H04L 1/1614
See application file for complete search history.

(56) References Cited

U.S. PATENT DOCUMENTS

| | | | |
|---|---|---|---|
| 7,010,329 B2 | 3/2006 | Livet et al. | |
| 7,190,673 B2 | 3/2007 | Cuffaro et al. | |

(Continued)

FOREIGN PATENT DOCUMENTS

| | | |
|---|---|---|
| CA | 2724595 | 12/2009 |
| CA | 2724595 A1 | 12/2009 |

(Continued)

OTHER PUBLICATIONS

U.S. Appl. No. 61/349,671, filed May 2010, Ho et al.
(Continued)

*Primary Examiner* — Ronald B Abelson
(74) *Attorney, Agent, or Firm* — Procopio, Cory, Hargreaves & Savitch LLP

(57) ABSTRACT

Methods, apparatuses, and software can be used for providing power headroom reporting in a telecommunication system. A method can include configuring a user equipment to send a power headroom report control element in uplink, wherein the power headroom report control element includes a bitmap indicating which power headroom reports are being reported. The method can further include receiving the power headroom report control element from the user equipment. The method additionally can include processing the received power headroom report control element based on the configuration of the user equipment.

10 Claims, 13 Drawing Sheets

Basic illustration of Component Carriers to form LTE-Advanced system bandwidth

Related U.S. Application Data continuation of application No. 14/500,398, filed on Sep. 29, 2014, now Pat. No. 9,025,590, which is a continuation of application No. 13/164,266, filed on Jun. 20, 2011, now Pat. No. 8,848,556.

(60) Provisional application No. 61/356,867, filed on Jun. 21, 2010.

(51) Int. Cl.
*H04L 1/16* (2006.01)
*H04W 52/14* (2009.01)
*H04W 52/28* (2009.01)

(52) U.S. Cl.
CPC ...... *H04W 72/0413* (2013.01); *H04W 52/146* (2013.01); *H04W 52/286* (2013.01)

(56) References Cited

U.S. PATENT DOCUMENTS

| | | |
|---|---|---|
| 7,764,966 B2 | 7/2010 | Derryberry et al. |
| 8,081,698 B2 | 12/2011 | Xu et al. |
| 8,351,359 B2 | 1/2013 | Heo et al. |
| 8,437,798 B2 | 5/2013 | Fabien et al. |
| 8,537,767 B2 | 9/2013 | Zhang et al. |
| 8,626,225 B2 | 1/2014 | Heo et al. |
| 8,848,556 B2 | 9/2014 | Wu et al. |
| 8,855,061 B2 | 10/2014 | Heo et al. |
| 8,867,440 B2 | 10/2014 | Ho et al. |
| 9,025,590 B2 | 5/2015 | Wu et al. |
| 2003/0083089 A1 | 5/2003 | Malladi |
| 2008/0084848 A1 | 4/2008 | Jard et al. |
| 2009/0175187 A1 | 7/2009 | Jersenius et al. |
| 2009/0318180 A1 | 12/2009 | Yi et al. |
| 2010/0158147 A1 | 6/2010 | Zhang et al. |
| 2010/0238863 A1 | 9/2010 | Guo et al. |
| 2010/0296467 A1 | 11/2010 | Pelletier et al. |
| 2010/0296470 A1 | 11/2010 | Heo et al. |
| 2011/0092217 A1 | 4/2011 | Kim et al. |
| 2011/0134774 A1 | 6/2011 | Pelletier et al. |
| 2011/0243016 A1 | 10/2011 | Zhang et al. |
| 2011/0292874 A1 | 12/2011 | Ho et al. |
| 2012/0008552 A1 | 1/2012 | Baldemair et al. |
| 2012/0083310 A1* | 4/2012 | Zhao ............... H04L 5/001 455/522 |
| 2012/0087317 A1 | 4/2012 | Bostrom et al. |
| 2013/0028223 A1* | 1/2013 | Kim ............... H04L 5/0007 370/329 |
| 2013/0051259 A1 | 2/2013 | Kim et al. |
| 2013/0064131 A1 | 3/2013 | Kwon et al. |
| 2013/0094450 A1 | 4/2013 | Umesh et al. |
| 2014/0307681 A1 | 10/2014 | Feuersaenger et al. |
| 2015/0049722 A1 | 2/2015 | Wu et al. |
| 2015/0215878 A1 | 7/2015 | Wu et al. |

FOREIGN PATENT DOCUMENTS

| | | |
|---|---|---|
| CN | 101715207 | 5/2010 |
| CN | 101715207 A | 5/2010 |
| GB | 2460958 A | 12/2009 |
| GB | 2460958 | 10/2010 |
| JP | 2013-509759 | 3/2013 |
| JP | 2013509759 A | 3/2013 |
| JP | 2013-519325 | 5/2013 |
| JP | 2013519325 A | 5/2013 |
| JP | 2013-543345 | 11/2013 |
| JP | 2013543345 A | 11/2013 |
| KR | 2009-0031433 | 3/2009 |
| KR | 20090031433 A | 3/2009 |
| RU | 2386213 | 4/2010 |
| RU | 2386213 C2 | 4/2010 |
| WO | 2007034552 A1 | 3/2007 |
| WO | WO 2007/034552 | 3/2007 |
| WO | 2009154403 A2 | 12/2009 |
| WO | WO 2009/154403 | 12/2009 |
| WO | 2010065759 A2 | 6/2010 |
| WO | WO 2010/065759 | 6/2010 |
| WO | 2011050921 A1 | 5/2011 |
| WO | WO 2011/050921 | 5/2011 |
| WO | 2011073191 A1 | 6/2011 |
| WO | WO 2011/073191 | 6/2011 |
| WO | 2011159126 A2 | 12/2011 |
| WO | WO 2011/159126 | 12/2011 |

OTHER PUBLICATIONS

U.S. Appl. No. 61/410,655, filed Nov. 2010, Lu et al.
ZTE, "Discussion on PHR report," 3GPP TSG RAN WG2 #70, R2-102817, Montreal, Canada, May 10-14, 2010, 5 pgs.
ZTE, "Power Headroom Reporting for Carrier Aggregation in LTE-Advanced," 3GPP TSG WG1 Meeting #60bis, R1-101814, Beijing, China, Apr. 12-16, 2010, 4 pgs.
U.S. Appl. No. 61/180,652, filed May 2009, Heo et al.
U.S. Appl. No. 61/282,813, filed Apr. 2010, Zhang et al.
U.S. Appl. No. 61/293,366, filed Jan. 2010, Marinier et al.
U.S. Appl. No. 61/303,920, filed Feb. 2010, Heo et al.
U.S. Appl. No. 61/303,937, filed Feb. 2010, Marinier et al.
U.S. Appl. No. 61/320,211, filed Apr. 2010, Heo et al.
U.S. Appl. No. 61/320,405, filed Apr. 2010, Marinier et al.
U.S. Appl. No. 61/344,237, filed Jun. 2010, Zhang et al.
Civil Action No. 6:14-cv-982 (Consolidated Lead Case), *Cellular Communications Equipment LLC v. LG Electronics, Inc. et al.*, Defendants' Joint Invalidity Contentions and Production of Documents Pursuant to Patent Rules 3-3 and 3-4(B), with Exhibit A relating to U.S. Pat. No. 8,848,556, Jul. 10, 2015, 793 pgs.
Civil Action No. 6:14-cv-982 (Consolidated Lead Case), *Cellular Communications Equipment LLC v. LG Electronics, Inc. et al.*, Plaintiff's Preliminary Disclosure of Asserted Claims and Infringement Contentions, with Exhibit C relating to U.S. Pat. No. 8,848,556, E.D. Tex., May 15, 2015, 33 pgs.
Civil Action No. 6:14-cv-982, *Cellular Communications Equipment LLC v. LG Electronics, Inc. et al.*, Joint Claim Construction and Pre-Hearing Statement, with Exhibits, Sep. 14, 2015, 20 pgs.
Civil Action No. 6:14-cv-982, *Cellular Communications Equipment LLC v. LG Electronics, Inc. et al.*, Defendants' Letter Brief—Motion for Summary Judgement of Invalidity based on Indefiniteness, E.D. Tex., Sep. 25, 2015, 7 pgs.
Civil Action No. 6:14-cv-982, *Cellular Communications Equipment LLC v. LG Electronics, Inc. et al.*, Plaintiff's Opening Brief on Claim Construction, E.D. Tex., Oct. 26, 2015, 28 pgs.
Civil Action No. 6:14-cv-982, *Cellular Communications Equipment LLC v. LG Electronics, Inc. et al.*, Defendants' Joint Responsive Markman Brief, with relevant Exhibits, E.D. Tex., Nov. 9, 2015, 222 pgs.
Civil Action No. 6:14-cv-982, *Cellular Communications Equipment LLC v. LG Electronics, Inc. et al.*, Declaration for Dr. Andrew C. Singer Accompanying Defendants' Joint Responsive Markman Brief, E.D. Tex., Nov. 9, 2015, 54 pgs.
Civil Action No. 6:14-cv-982, *Cellular Communications Equipment LLC v. LG Electronics, Inc. et al.*, Plaintiff's Reply Brief on Claim Construction, with relevant Exhibits, E.D. Tex., Nov. 18, 2015, 66 pgs.
Civil Action No. 6:14-cv-982, *Cellular Communications Equipment LLC v. LG Electronics, Inc. et al.*, Declaration of Claude Royer, E.D. Tex., Nov. 18, 2015, 24 pgs.
*Sony Mobile Communications (USA) Inc. v. Cellular Communications Equipment LLC*, Petition for Inter Partes Review of U.S. Pat. No. 8,848,556, with Exhibits, IPR2015-01716, P.T.A.B., Aug. 11, 2015, 1,199 pgs.
*Sony Mobile Communications (USA) Inc. v. Cellular Communications Equipment LLC*, Declaration of Professor Bruce McNair, IPR2015-01716, P.T.A.B., Aug. 7, 2015, 52 pgs.
*Sony Mobile Communications (USA) Inc. v. Cellular Communications Equipment LLC*, Declaration of Dr. Raziq Yaqub, IPR2015-01716, P.T.A.B., Aug. 11, 2015, 343 pgs.
*Sony Mobile Communications (USA) Inc. v. Cellular Communications Equipment LLC*, Patent Owner Cellular Communications

(56) References Cited

OTHER PUBLICATIONS

Equipment LLC's Preliminary Response to Petition for Inter Partes Review, IPR2015-01716, P.T.A.B., Nov. 18, 2015, 28 pgs.
*Sony Mobile Communications (USA) Inc.* v. *Cellular Communications Equipment LLC*, Decision—Institution of Inter Partes Review, IPR2015-01716, P.T.A.B., Feb. 4, 2016, 12 pgs.
*LG Electronics, Inc.* v. *Cellular Communications Equipment LLC*, Petition for Inter Partes Review of U.S. Pat. No. 8,848,556, with Exhibits, IPR2016-00197, P.T.A.B., Nov. 17, 2015, 1780 pgs.
*LG Electronics, Inc.* v. *Cellular Communications Equipment LLC*, Declaration of Branimir Vojcic, IPR2016-00197, P.T.A.B., Nov. 13, 2015, 77 pgs.
*LG Electronics, Inc.* v. *Cellular Communications Equipment LLC*, Patent Owner's Preliminary Response, IPR2016-00197, P.T.A.B., Feb. 18, 2016, 38 pgs.
*LG Electronics, Inc.* v. *Cellular Communications Equipment LLC*, Decision—Denying Institution of Inter Partes Review, P.T.A.B., Apr. 29, 2016, 13 pgs.
*LG Electronics, Inc.* v. *Cellular Communications Equipment LLC*, Petition for Inter Partes Review of U.S. Pat. No. 8,848,556, with Exhibits, 1PR2016-00711, P.T.A.B., Mar. 3, 2016, 1199 pgs.
3GPP TS 36.213 V8.7.0 (May 2009), "3rd Generation Partnership Project; Technical Specification Group Radio Access Network; Evolved Universal Terrestrial Radio Access (E-UTRA); Physical layer procedures (Release 8)," May 2009, 77 pgs.
3GPP TS 36.321 V8.8.0, "3rd Generation Partnership Project; Technical Specification Group Radio Access Network; Evolved Universal Terrestrial Radio Access (E-UTRA) Medium Access Control (MAC) protocol specification (Release 8)," Dec. 2009, 44 pgs.
Alcatel-Lucent Shanghai Bell, Alcatel-Lucent, "Considerations on PHR for CA," 3GPP TSG-RAN WG2 Meeting #70, R2-102879, May 10, 2010, 3 pgs.
Alcatel-Lucent Shanghai Bell, Alcatel-Lucent, "Power headroom reporting for carrier aggregation," 3GPP TSG-RAN WG1 #60bis, R1-101852, Beijing, China, Apr. 12-16, 2010, 3 pgs.
Dahlman et al., "3G Evolution: HSPA and LTE for Mobile Broadband," Second Edition, pp. 482-488 and 543-544, Oct. 2008, 11 pgs.
Ericsson, ST Ericsson, "Details on PHR Reporting," 3GPP TSG-RAN WG2 #70, Tdoc R2-102960, Montreal, Canada, May 10-14, 2010, 3 pgs.
ETSI TS 136 133 V8.6.0 (Jul. 2009), LTE; Evolved Universal Terrestrial Radio Access (E-UTRA); Requirements for support of radio resource management (3GPP TS 36.133 version 8.6.0 Release 8), Jul. 2009, 260 pgs.
ETSI TS 136 213 V8.7.0 (Jun. 2009), LTE; Evolved Universal Terrestrial Radio Access (E-UTRA); Physical layer procedures (3GPP TS 36.213 version 8.7.0 Release 8), Jun. 2009, 79 pgs.
ETSI TS 136 321 V8.6.0 (Jul. 2009), LTE; Evolved Universal Terrestrial Radio Access (E-UTRA); Medium Access Control (MAC) protocol specification (3GPP TS 36.321 version 8.6.0 Release 8), Jul. 2009, 49 pgs.
ETSI TS 136 321 V11.0.0 (Oct. 2012), LTE; Evolved Universal Terrestrial Radio Access (E-UTRA); Medium Access Control (MAC) protocol specification (3GPP TS 36.321 version 11.0.0 Release 11), Oct. 2012, 57 pgs.
ETSI TS 136 331 V8.6.0 (Jul. 2009), LTE; Evolved Universal Terrestrial Radio Access (E-UTRA); Radio Resource Control (RRC); Protocol specification (3GPP TS 36.331 version 8.6.0 Release 8), Jul. 2009, 211 pgs.
ETSI TS 136 331 V8.9.0 (Apr. 2010), LTE; Evolved Universal Terrestrial Radio Access (E-UTRA); Radio Resource Control (RRC); Protocol specification (3GPP TS 36.331 version 8.9.0 Release 8), Apr. 2010, 215 pgs.
ETSI TS 136 331 V10.1,0 (Apr. 2011), LTE; Evolved Universal Terrestrial Radio Access (E-UTRA); Radio Resource Control (RRC); Protocol specification (3GPP TS 36,331 version 10.1.0 Release 10), Apr. 2011, 292 pgs.
International Search Report for International Application No. PCT/EP2011/060118 dated Sep. 2, 2011.
Japanese Patent Office, Notice of Reasons for Rejection for Japanese Patent Application No. 2013-515821 dated Jan. 6, 2014, 2 pgs.
LG Electronics, "Remaining issues about power headroom reporting for LTE-A," 3GPP TSG RAN WG1 #60bis, R1-102413, Beijing, China, Apr. 12-16, 2010, 5 pgs.
LG Electronics, "Remaining issues about power headroom reporting for LTE-A," 3GPP TSG RAN WG1 #61, R1-102693, Montreal, Canada, May 10-14, 2010, 5 pgs.
NTT DOCOMO, Inc., "PHR for carrier aggregation," 3GPP TSG-RAN2#70, R2-103232, Montreal, Canada, May 10-14, 2010, 3 pgs.
Potevio, "Remaining Issues on PHR for CA," 3GPP TSG RAN WG2 #70, R2-102770, May 10, 2010, 3 pgs.
Qualcomm Incorporated, "DRAFT: LS on power headroom reporting for carrier aggregation," 3GPP TSG RAN WG1 Meeting #61, R1-103357, Montreal, Canada, May 10-14, 2010, 1 pg.
RAN1, "LS on power headroom reporting for carrier aggregation," 3GPP TSG RAN WG1 Meeting #61, R1-103405, Montreal, Canada, May 10-14, 2010, 1 pg.
RAN1, "LS on power headroom reporting for carrier aggregation," 3GPP TSG RAN WG2 Meeting #70, R2-103445, Montreal, Canada, May 10-14, 2010, 1 pg.
Samsung, "PUCCH/PUSCH power headroom reporting," 3GPP TSG RAN WG1 Meeting #60bis, R1-102179, Beijing, China, Apr. 12-16, 2010, 3 pgs.
Sesia et al., "LTE—The UMTS Long Term Evolution: From Theory to Practice" pp. 7 0-110 and 459-471, Feb. 2009, 47 pgs.
ZTE, "Discussion on PHR report," 3GPP TSG RAN WG2 #70, R2-102317, Montreal, Canada, May 10-14, 2010, 5 pgs.
Civil Action No. 6:14-cv-982 (Consolidated Lead Case), *Cellular Communications Equipment LLC* v. *LG Electronics, Inc. et al.*, Defendants' Joint Invalidity Contentions and Production of Documents Pursuant to Patent Rules 3-3 and 3-4 (B), with Exhibit A relating to U.S. Pat. No. 8,848,556, Jul. 10, 2015, 793 pgs.
Civil Action No. 6:14-cv-982, *Cellular Communications Equipment LLC* v. *LG Electronics, Inc. et al.*, Declaration of Dr. Andrew C. Singer Accompanying Defendants' Joint Responsive Markman Brief, E.D. Tex., Nov. 9, 2015, 54 pgs.
Civil Action No. 6:14-cv-982, *Cellular Communications Equipment LLC* v. *LG Electronics, Inc. et al.*, Defendants' Letter Brief—Motion for Summary Judgment of Invalidity based on Indefiniteness, E.D. Tex., Sep. 25, 2015, 7 pgs.
Civil Action No. 6:14-cv-982, *Cellular Communications Equipment LLC* v. *LG Electronics, Inc. et al.*, Plaintiffs Opening Brief on Claim Construction, E.D. Tex., Oct. 26, 2015, 28 pgs.
Civil Action No. 6:14-cv-982, *Cellular Communications Equipment LLC* v. *LG Electronics, Inc. et al.*, Plaintiffs Reply Brief on Claim Construction, with relevant Exhibits, E.D. Tex., Nov. 18, 2015, 66 pgs.
ETSI TS 136 331 V10.1.0 (Apr. 2011), LTE; Evolved Universal Terrestrial Radio Access (E-UTRA); Radio Resource Control (RRC); Protocol specification (3GPP TS 36.331 version 10.1.0 Release 10), Apr. 2011, 292 pgs.
Japanese Patent Office, Notice of Reasons for Rejection for Japanese Patent Application No. 2013-515821 dated Jan. 5, 2014, 2 pgs.
*LG Electronics, Inc.* v. *Cellular Communications Equipment LLC*, Declaration of Branimir Vojcic, IPR2016-00197, P.T. A.B., Nov. 13, 2015, 77 pgs.
*LG Electronics, Inc.* v. *Cellular Communications Equipment LLC*, Petition for Inter Partes Review of U.S. Pat. No. 8,848,556, with Exhibits, IPR2016-00711, P.T.A.B., Mar. 3, 2016, 1199 pgs.
Sesia et al., "LTE—The UMTS Long Term Evolution: From Theory to Practice," pp. 79-110 and 459-471, Feb. 2009, 47 pgs.
*Sony Mobile Communications (USA) Inc.* v. *Cellular Communications Equipment LLC*, Petition for Inter Partes Review of U.S. Pat. No. 8,848,556, with Exhibits. IPR2015-01716, P.T.A.B., Aug. 11, 2015, 1,199 pgs.

\* cited by examiner

Figure 1: Basic illustration of Component Carriers to form LTE-Advanced system bandwidth E1/R/E/LCID sub-header T/R/E/LCID sub-header R/R/E/LCID sub-header

CARRIER AGGREGATION WITH POWER HEADROOM REPORT

CROSS-REFERENCE TO RELATED APPLICATION

The present application is a continuation of U.S. patent application Ser. No. 14/678,870 filed Apr. 3, 2015 (Publication No. 2015/0215878); which is a continuation of U.S. patent application Ser. No. 14/500,398 filed Sep. 29, 2014 and issued May 5, 2015 as U.S. Pat. No. 9,025,590; which is a continuation of U.S. patent application Ser. No. 13/164,266 filed Jun. 20, 2011 and issued Sep. 30, 2014 as U.S. Pat. No. 8,848,556; which is related to and claims the priority of U.S. Provisional Patent Application No. 61/356,867 filed Jun. 21, 2010; the entirety of which are hereby incorporated herein by reference.

BACKGROUND

Field

Carrier aggregation (CA) is a technique that is applicable to such networks as evolved universal terrestrial radio access (E-UTRA) networks (E-UTRAN). E-UTRAN is just one example, as the technique may be used in other kinds of networks. In carrier aggregation, two or more component carriers (CCs) or serving cells can be aggregated in order to support wider transmission bandwidths up to, for example, 100 MHz and for spectrum aggregation. In carrier aggregation, it is possible to configure a user equipment (UE) to aggregate a different number of component carriers or serving cells originating from the same enhanced node B (eNB) and of possibly different bandwidths in the uplink (UL) and the downlink (DL).

Description of the Related Art

In releases 8 and 9 of the third generation partnership project (3GPP), without carrier aggregation, a power headroom report is triggered if any of the following occur, see 3GPP specification, 36.321, which is hereby incorporated herein by reference: a timer called "prohibitPHR-Timer" expires or has expired and the path loss has changed more than a predetermined amount, "dl-PathlossChange" dB, since the transmission of a power headroom report when the user equipment has uplink resources for new transmission; a timer called "periodicPHR-Timer" expires; or upon configuration or reconfiguration of the power headroom reporting functionality by upper layers, which is not used to disable the function. The "prohibitPHR-Timer," "periodicPHR-Timer," and "dl-PathlossChange," are configured by a radio resource controller. Similar power headroom report triggering could also be applied to carrier aggregation. When power headroom reporting is triggered, power headroom reports on all the scheduled CC (or serving cells) or configured CC (or configured serving cells) should be reported.

One approach to addressing power headroom reporting is to limit each power headroom report (PHR) to the corresponding component carrier. Although such an approach minimizes changes, because of potential hybrid automatic repeat request (HARQ) retransmission timing differences, the eNB cannot obtain a power headroom report from all component carriers at the same time. Furthermore, one logical channel identifier (LCID) is used per reported component carrier (or serving cell), increasing overhead.

Another option is to allow a cross carrier power headroom report with a cross carrier indicator for each power headroom report to indicate which component carrier (or serving cell) it is referring to. This approach requires one media access control (MAC) sub-header for each individual power headroom report or a "length" field to indicate the length for such variable size payload. Furthermore, there are only 2 R bits in the power headroom report MAC control element (CE) which is not enough to indicate 5 component carriers (or serving cells).

SUMMARY

A method, in certain embodiments, includes configuring a user equipment to send a power headroom report control element in uplink. The power headroom report control element includes a bitmap indicating which power headroom reports are being reported. The method further includes receiving the power headroom report control element from the user equipment. The method additionally includes processing the received power headroom report control element based on the configuration of the user equipment.

In another embodiment, a method includes preparing a power headroom report control element, based on a trigger configured by a base station. The trigger determines when a power headroom report control element is to be sent in uplink. Preparing the control element includes incorporating a bitmap indicating which power headroom reports are being reported. The method further includes sending the prepared power headroom report control element to the base station.

A non-transitory computer readable medium, in certain further embodiments, is encoded with a computer program that, when executed in hardware, causes the hardware to perform a process. The process includes configuring a user equipment to send a power headroom report control element in uplink. The power headroom report control element includes a bitmap indicating which power headroom reports are being reported. The process further includes receiving the power headroom report control element from the user equipment. The process additionally includes processing the received power headroom report control element based on the configuration of the user equipment.

A non-transitory computer readable medium, in another embodiment, is encoded with a computer program that, when executed in hardware, causes the hardware to perform a process. The process can also include preparing a power headroom report control element, based on a trigger configured by a base station. The trigger determines when a power headroom report control element is to be sent in uplink. Preparing the control element includes incorporating a bitmap indicating which power headroom reports are being reported. The process further includes sending the prepared power headroom report control element to the base station.

In certain embodiments, an apparatus includes at least one processor and at least one memory including computer program code. The at least one memory and computer program code are configured to, with at least one processor, cause the apparatus at least to configure a user equipment to send a power headroom report control element in uplink. The power headroom report control element includes a bitmap indicating which power headroom reports are being reported. The at least one memory and computer program code are also configured to, with at least one processor, cause the apparatus at least to receive the power headroom report control element from the user equipment. The at least one memory and computer program code are further configured to, with at least one processor, cause the apparatus at least to process the received power headroom report control element based on the configuration of the user equipment.

An apparatus, in another embodiment, includes at least one processor and at least one memory including computer program code. The at least one memory and computer program code are configured to, with at least one processor, cause the apparatus at least to prepare a power headroom report control element, based on a trigger configured by a base station. The trigger determines when a power headroom report control element is to be sent in uplink. The at least one memory and computer program code are also configured to, with at least one processor, cause the apparatus at least to prepare the control element by incorporating a bitmap indicating which power headroom reports are being reported. The at least one memory and computer program code are also configured to, with at least one processor, cause the apparatus at least to send the prepared power headroom report control element to the base station.

In certain embodiments, an apparatus includes configuring means for configuring a user equipment to send a power headroom report control element in uplink. The power headroom report control element includes a bitmap indicating which power headroom reports are being reported. The apparatus also includes receiving means for receiving the power headroom report control element from the user equipment. The apparatus further includes processing means for processing the received power headroom report control element based on the configuration of the user equipment.

An apparatus, according to certain embodiments, includes preparing means for preparing a power headroom report control element, based on a trigger configured by a base station. The trigger determines when a power headroom report control element is to be sent in uplink. Preparing the control element includes incorporating a bitmap indicating which power headroom reports are being reported. The apparatus also includes sending means for sending the prepared power headroom report control element to the base station.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Certain embodiments of the present invention report power headroom using a new power headroom report MAC control element which can start with a bitmap indicating which power headroom reports are being reported. Each bit of the bitmap can be linked to a particular power headroom report (e.g. primary serving cell (PCell) PHR, secondary serving cell (SCell), such as SCell1, PHR#) and the order in which the bits are read in the bitmap also defines the order in which the power headroom reports follow the bitmap. The bitmap can, therefore, indicate the size of the power headroom report MAC control element. Thus, the control element can address variable power headroom report size and can avoid using one sub-header per individual power headroom report.

It may be beneficial to limit power headroom reporting to the serving cells that are scheduled to reduce overhead and simplify power headroom evaluation from user equipment side. Also, it may be beneficial for the eNB to obtain, at the same time, power headroom reports for all the serving cells scheduled. Because of potential hybrid automatic repeat request (HARQ) retransmission timing differences, scheduling all component carriers with new transmission in the same transmission time interval (TTI) may not be feasible.

Figure 1:
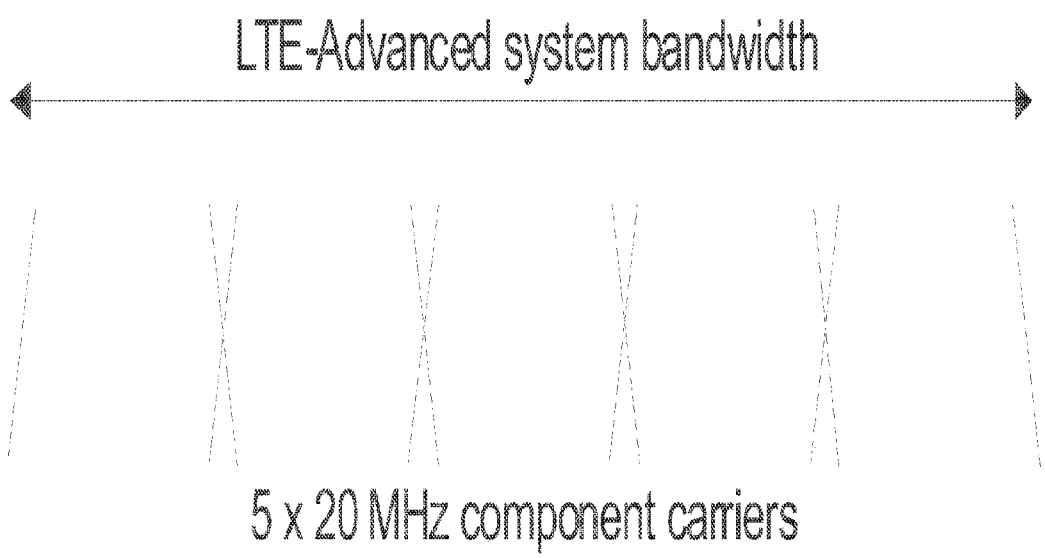
FIG. 1 illustrates carrier aggregation.

The principle of carrier aggregation is illustrated in FIG. 1. Third generation partnership project (3GPP) release 8 (Rel-8) user equipment may be served by a stand-alone component carrier or serving cell, while release 10 (Rel-10) terminals can be configured to receive or transmit simultaneously on multiple component carriers or remote serving cells in the same transmission time interval (TTI).

When carrier aggregation is configured, the user equipment only has one radio resource control (RRC) connection with the network. At RRC connection establishment/re-establishment, one serving cell provides the security input and the non-access stratum (NAS) mobility information (e.g. timing advance information (TAI)) similarly as in Rel-8/9. The security input can include one E-UTRAN cell global identifier (ECGI), one physical cell identity (PCI) and one absolute radio-frequency channel number (ARFCN).

This cell that provides the security input and the NAS mobility information is referred to as the primary serving cell (PCell). In the downlink, the carrier corresponding to the PCell is the downlink (DL) primary component carrier (DL PCC) while in the uplink it is the uplink (UL) primary component carrier (UL PCC).

Depending on user equipment capabilities, secondary serving cells (SCells) can be configured to form, together with the PCell, a set of serving cells. In the downlink, the carrier corresponding to an SCell is a downlink secondary component carrier (DL SCC) while in the uplink it is an uplink secondary component carrier (UL SCC).

In view of the above, the configured set of serving cells for a user equipment may always include one PCell and one or more SCells. For each SCell, the usage of uplink resources by the user equipment in addition to the downlink ones can be configurable. The number of DL SCCs configured can, therefore, be set always to be larger or equal to the number of UL SCCs and, thus, no SCell can be configured for usage of uplink resources only. Additionally, the number of serving cells that can be configured can depend upon the aggregation capability of the user equipment.

Furthermore, to assist the scheduler, the eNB can configure user equipment to send buffer status reports (BSRs) and power headroom reports in uplink. BSR can indicate the amount of data the user equipment has available for transmission. A power headroom report can provide the eNB with information about the difference between the nominal user equipment maximum transmit power and the estimated power for uplink synchronization channel (UL-SCH) transmission.

A power headroom report can be sent by the user equipment in uplink in the form of PHR media access control (MAC) control elements in which the "power headroom" field indicates the power headroom level. In the context of carrier aggregation, per component carrier (or serving cell) power headroom reporting can be used, and, optionally, per user equipment power headroom reporting can also be used on top of those.

As mentioned above, a new power headroom report MAC control element can be provided, which starts with a bitmap indicating which PHRs are being reported. Each bit of the bitmap can be linked to a particular power headroom report (e.g. PCell PHR, SCell1 PHR . . . ) and the order in which the bits are read in the bitmap can also define the order in which the power headroom reports follow the bitmap. The bitmap therefore indicates the size of the power headroom report MAC control element.

The bit in the bitmap can indicate whether a power headroom (PH) field is being reported. For example, a bit set to "1" can indicate that a power headroom field for a corresponding secondary cell is being reported. The bit set to "0", on the other hand, can indicate that a power headroom field for a corresponding secondary cell is not being reported. Thus, for example if the bit for SCell_i is set to zero, the power headroom field for the secondary cell with secondary cell index i is not being reported. Alternatively, the opposite convention can be used, wherein "1" indicates that a report is not being provided and "0" indicates that a report is being provided.

For example, the bitmap can be 8 bits long and can be organized as follows. A first bit can be used for a user equipment power headroom report (UE-PHR). The use of the first bit for UE-PHR is, of course, an optional item. In some embodiments, there may be no need for such a PHR in addition to per-CC PHR.

A second bit can be used for Type 1 PHR for PCell. A third bit can be used for Type 2 PHR for PCell. Fourth through seventh bits can be for PHR of SCell1, SCell2, SCell3, and SCell4. There can also be one reserved bit. In other embodiments, such as if the first bit is not used for UE-PHR, there can be more than one reserved bit.

Type 1 and Type 2 power headroom reports may employ the following definition. Their presence can be indicated to the eNB. Type 1 power headroom report can be computed as: P_cmax,c minus PUSCH power. Type 2 power headroom report can be computed as: P_cmax,c minus PUCCH power minus PUSCH power.

There are some additional considerations as well. For PCell, if in a TTI there can be either only Type 1 or Type 2 PHR, one bit in the bitmap can be used to indicate the type.

Figure 9:
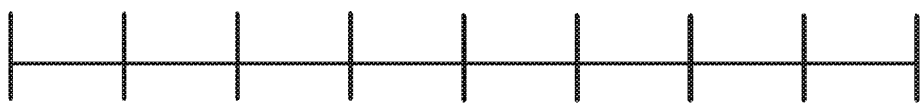
FIG. 9 illustrates a format in which a single bit is used to indicate whether Type 1 power headroom report or Type 2 power headroom report is being used.
Figure 10:
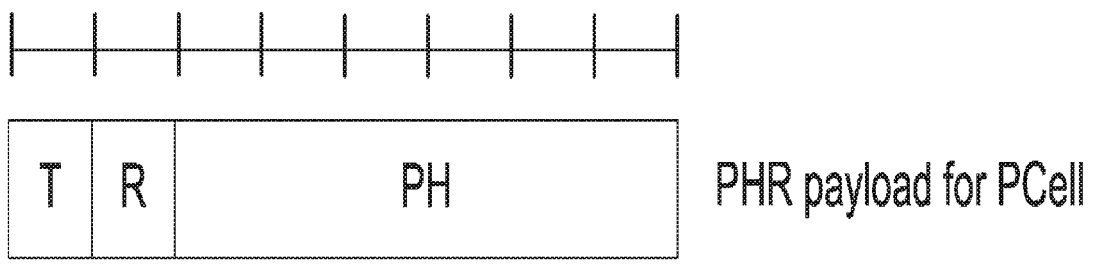
FIG. 10 illustrates a format in which Type 1 and Type 2 power headroom reports are indicated via the R bit in the power headroom report payload for PCell.
Figure 11:
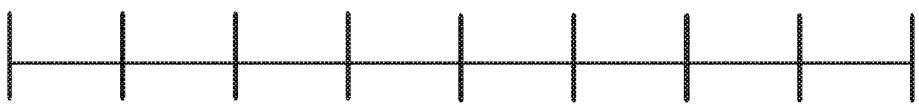
FIG. 11 illustrates a format in which a new logical channel identifier is used for a Type 2 power headroom report, while for Type 1 the format can correspond to a release 8 format.

Still another possibility for PCell is to indicate Type 1 and Type 2 power headroom reports via the R bit in the MAC sub-header for PCell. This format is illustrated in FIG. 9. Still another possibility for PCell is to indicate Type 1 and Type 2 power headroom reports via the R bit in the power headroom report payload for PCell. This format is illustrated in FIG. 10. A further alternative is to use a new logical channel identifier for Type 2 power headroom report, while for Type 1 the format can correspond to a release 8 format. Then, if there is only a power headroom report for PCell included, the bitmap byte is not needed. This format is illustrated in FIG. 11.

The order of SCells can be according the order in which they are configured or according to a cell index or component carrier index. If only a power headroom report for one serving cell is needed in a TTI, a simplified format could be used.

Figure 2:
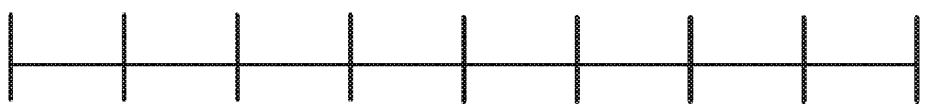
FIG. 2 illustrates an E1/R/LCID sub-header.
Figure 3:
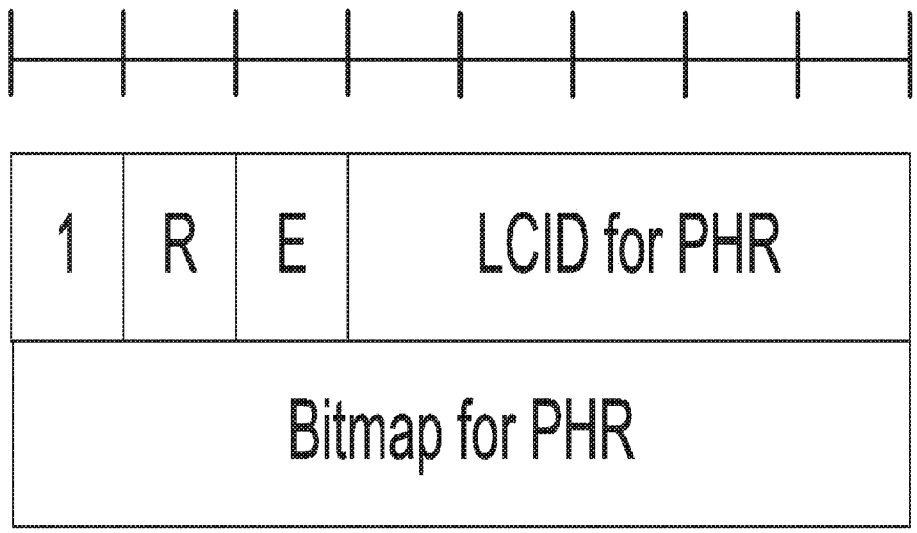
FIG. 3 illustrates a sub-header for power headroom reporting.

The new power headroom report format could use a new logical channel identifier (LCID) or make use of one of the R bits of the subheader to indicate the occurrence of the bitmap. This bit is denoted E1 in FIG. 2. The bitmap could either follow the MAC Sub-header for a power headroom report, or it can be as the first byte of the power headroom report payload. FIG. 3 illustrates the bitmap for the power headroom report has a sub-header.

Figure 4:
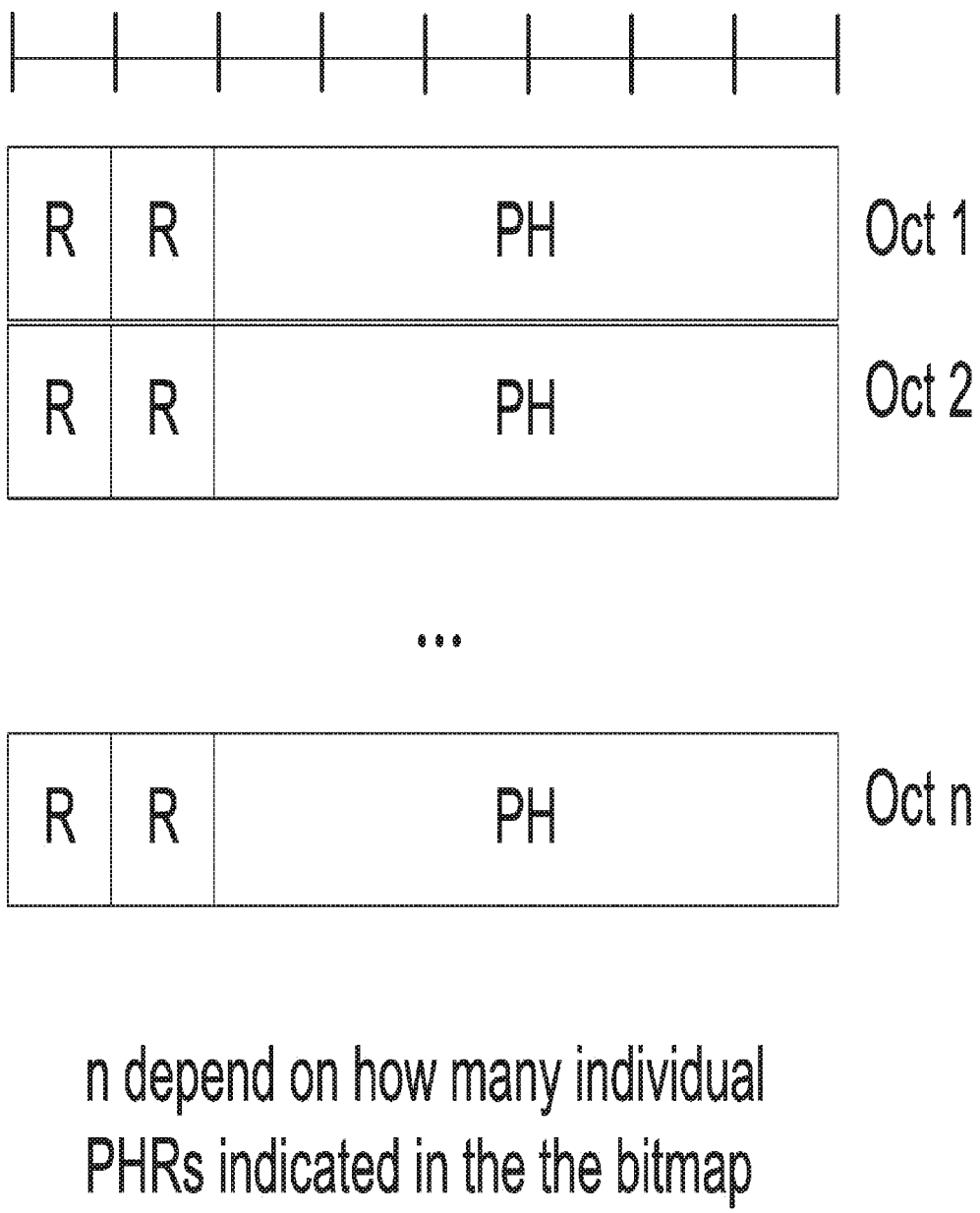
FIG. 4 illustrates individual power headroom reports for each component carrier.
Figure 5:
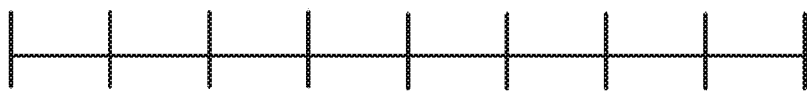
FIG. 5 illustrates a power headroom report payload including a bitmap for power headroom reporting as the first octet.
Figure 12:
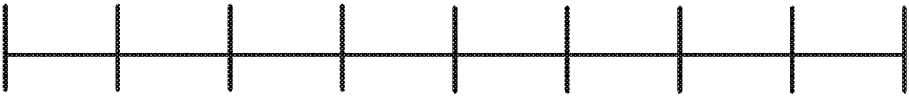
FIG. 12 illustrates a format in which each individual power headroom report is 6 bits, with R bits for byte alignment when the payload is not byte aligned.
Figure 13:
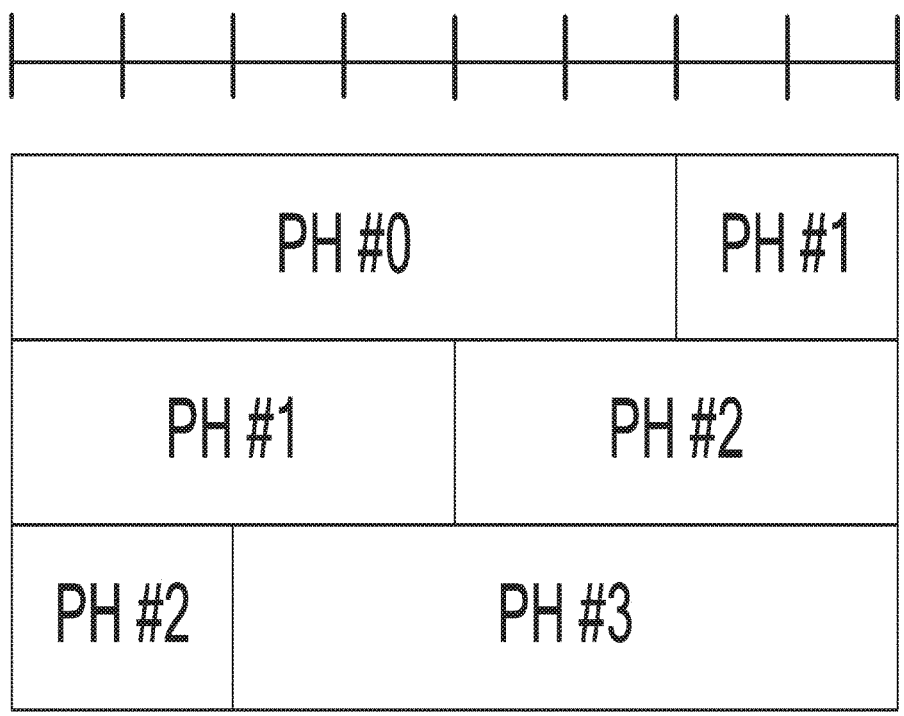
FIG. 13 illustrates a format in which each individual power headroom report is 6 bits, without R bits for byte alignment when the payload is byte aligned.

The individual power headroom report for each component carrier, each type or per UE PHR can resemble that found in Release 8 or Release 9: 1 byte for each component carrier with 2 R bits+6 bits PH. This approach is illustrated in FIG. 4. Alternatively, each individual power headroom report can be 6 bits, with R bits for byte alignment when the payload is not byte aligned, as shown in FIG. 12; when it is byte aligned, no R bit needed, as shown in FIG. 13. FIG. 5 shows an alternative embodiment in which the first octet of the payload is the bitmap for the power headroom report.

Various embodiments of the present invention may provide advantageous effects. For example, in certain embodiments, there may be no need to have a separate MAC sub-header for each individual power headroom report (different type of power headroom report, per component carrier power headroom report for each component carrier and per-UE power headroom report). Thus, overhead may be reduced. Additionally, issues arising from uncertainty of variable size may be avoided or handled. Furthermore, certain embodiments of the present invention may clearly and efficiently indicate which component carriers have power headroom report included, without a cross-CC indicator for each individual power headroom report separately.

Figure 6:
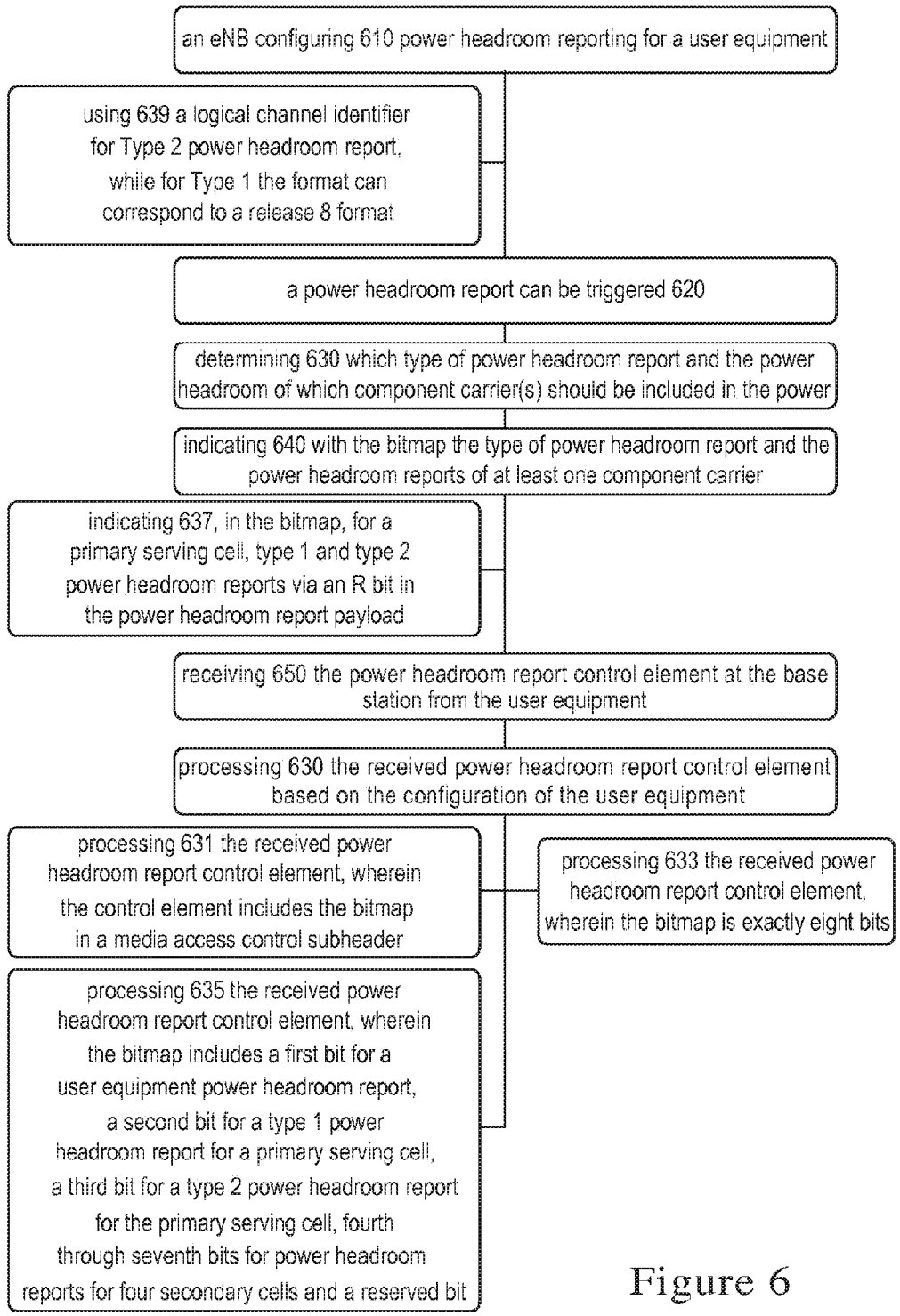
FIG. 6 illustrates a method according to certain embodiments of the present invention.

FIG. 6 illustrates a method according to certain embodiments of the present invention. The method can include an eNB configuring 610 power headroom reporting for a user equipment. In the method, a power headroom report can be triggered 620. The method can additionally include determining 630 which type of power headroom report and the power headroom of which component carrier(s) should be included in the power headroom report MAC control element. The method can also include indicating 640 with the bitmap the type of power headroom report and the power headroom reports of at least one component carrier.

The method can include receiving 650 the power headroom report control element at the base station from the user equipment. The method additionally includes processing 630 the received power headroom report control element based on the configuration of the user equipment. The method can include processing 631 the received power headroom report control element, wherein the control element includes the bitmap in a media access control subheader or in a payload. The method can also include processing 633 the received power headroom report control element, wherein the bitmap is exactly eight bits. The method can also include processing 635 the received power headroom report control element, wherein the bitmap includes a first bit for a user equipment power headroom report, a second bit for a type 1 power headroom report for a primary serving cell, a third bit for a type 2 power headroom report for the primary serving cell, fourth through seventh bits for power headroom reports for four secondary cells, and a reserved bit. Because the eight bits can include a reserved bit, the power headroom report control element can alternatively be said to be exactly seven bits in length.

The method can further include indicating 637, in the bitmap, for a primary serving cell, type 1 and type 2 power headroom reports via an R bit in the power headroom report payload for primary serving cell. The method can additionally include using 639 a logical channel identifier for Type 2 power headroom report, while for Type 1 the format can correspond to a release 8 format.

Figure 7:
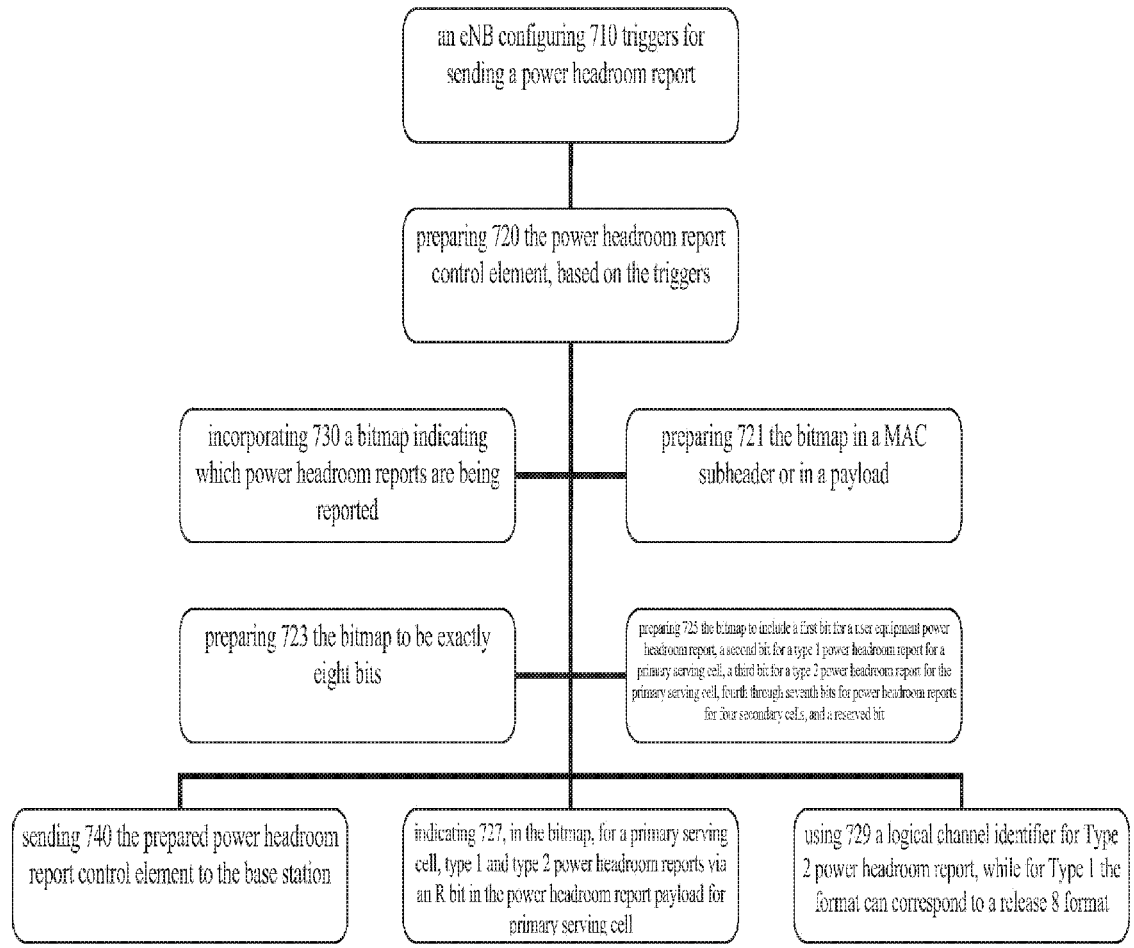
FIG. 7 illustrates a method according to certain embodiments of the present invention.

FIG. 7 illustrates a method according to another embodiment of the present invention. The method of FIG. 7 includes an eNB configuring 710 triggers for sending a power headroom report. The method can also include preparing 720 the power headroom report control element, based on the triggers. Preparing 720 the control element includes incorporating 730 a bitmap indicating which power headroom reports are being reported. The method further includes sending 740 the prepared power headroom report control element to the base station.

The preparing 720 the control element can include preparing 721 the bitmap in a MAC subheader or in a payload. The preparing 720 the control element can include preparing 723 the bitmap to be exactly eight bits. The preparing 720 the control element can include preparing 725 the bitmap to include a first bit for a user equipment power headroom report, a second bit for a type 1 power headroom report for a primary serving cell, a third bit for a type 2 power headroom report for the primary serving cell, fourth through seventh bits for power headroom reports for four secondary cells, and a reserved bit.

The method can further include indicating 727, in the bitmap, for a primary serving cell, type 1 and type 2 power headroom reports via an R bit in the power headroom report payload for primary serving cell. The method can additionally include using 729 a logical channel identifier for Type 2 power headroom report, while for Type 1 the format can correspond to a release 8 format.

The methods described in FIGS. 6-7 can be variously implemented. For example, the methods can be implemented using hardwire technique or by making a general purpose computing device a particular machine by supplying it with software instructions. The software instructions may be on a computer-readable medium, which may be any suitable medium that is tangible, such as a non-transitory computer readable medium. Thus, for example, the medium could be hard disk drive or a flash drive. Any form of random access memory (RAM) or read only memory (ROM) is acceptable. The software instructions can be structurally and/or functionally interrelated with hardware to perform the methods described above.

Figure 8:
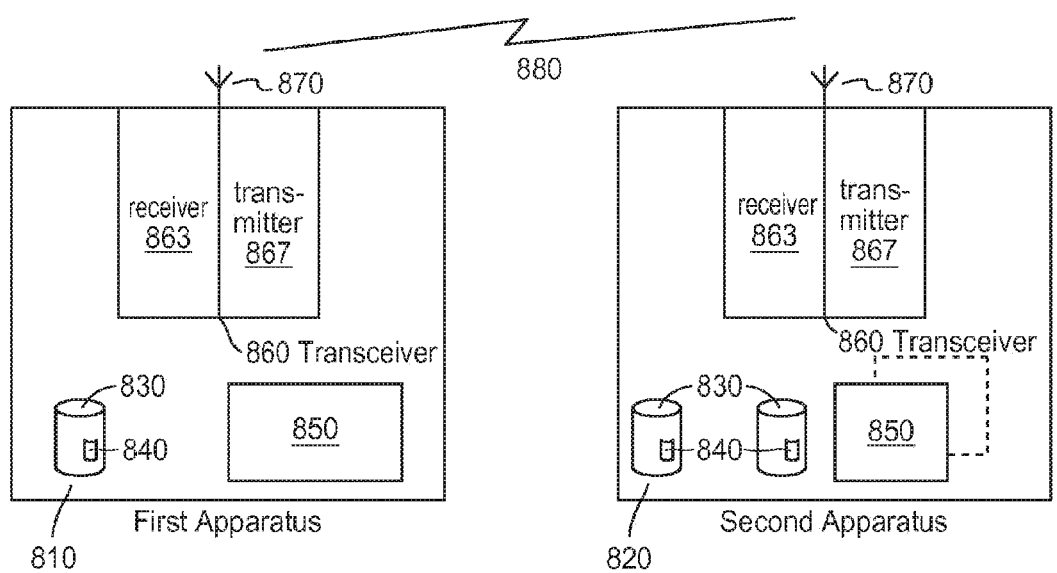
FIG. 8 illustrates a system according to certain embodiments of the present invention.

FIG. 8 illustrates a system according to certain embodiments of the present invention. The system as illustrated in FIG. 8 can include a first apparatus 810 and a second apparatus 820. The first apparatus 810 may be, for example, an eNB, base station, or similar device. The second apparatus 820 may be, for example, a user equipment that is equipped for communication in a network that permits carrier aggregation.

The first apparatus 810 and the second apparatus 820 may each include at least one memory 830 including computer program code 840, as well as at least one processor 850. The memory 830 may be any suitable data storage device, such as RAM or ROM. The computer program code 840 may be any suitable computer instructions, such instructions that are compiled into a machine language or provided in an interpreted language. The at least one processor 850 may be any processing device, such as one or more controllers, a central processing unit (CPU), or an application specific integrated circuit (ASIC). The at least one memory 830 and the computer program code 840 can be configured to, with the at least one processor 850, cause the first apparatus 810 or second apparatus 820 to perform a process, such as the processes illustrated in FIG. 6-7.

The first apparatus 810 and the second apparatus 820 may further include a transceiver 860 that includes a receiver 863 and transmitter 867. The first apparatus 810 and the second apparatus 820 may each be configured to communicate using a respective antenna 870 over a wireless link 880.

The first apparatus 810 and the second apparatus 820 may further include a transceiver 860 that includes a receiver 863 and transmitter 867. The first apparatus 810 and the second apparatus 820 may each be configured to communicate using a respective antenna 870 over a wireless link 880.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A non-transitory computer-readable medium including code for performing a process to be executed on a computer, the process comprising:
   configuring a user equipment, at a time, to send a first media access control (MAC) subheader and a first power headroom report (PHR) control element, the first MAC subheader including a first logical channel identifier (LCID), the first LCID corresponding to a power headroom report for a single component carrier;
   receiving the first PHR control element from the user equipment;
   processing the first PHR control element;
   configuring the user equipment, at another time, to send a second MAC subheader and a second PHR control element, the second MAC subheader including a second LCID, the second LCID indicating a bitmap in the second PHR control element, the bitmap including a plurality of bits for power headroom reports for a plurality of secondary cells;
receiving the second PHR control element from the user equipment; and
processing the second PHR control element.

2. The non-transitory computer-readable medium of claim 1, wherein an order of the plurality of bits in the bitmap defines an order in which the power headroom reports for the plurality of secondary cells follow the bitmap.

3. The non-transitory computer-readable medium of claim 1, wherein the bitmap indicates a size of the second PHR control element.

4. The non-transitory computer-readable medium of claim 1, wherein at least one bit of the plurality of bits corresponds to a user equipment power headroom report.

5. The non-transitory computer-readable medium of claim 4, wherein other bits of the plurality of bits correspond to the power headroom reports for the plurality of secondary cells.

6. A non-transitory computer-readable medium including code for performing a process to be executed on a computer, the process comprising:
preparing, at a time, a first media access control (MAC) subheader and a first power headroom report (PHR) control element, the first MAC subheader including a first logical channel identifier (LCID), the first LCID corresponding to a power headroom report for a single component carrier;
sending the first MAC subheader and the first PHR control element to a base station;
preparing, at another time, a second MAC subheader and a second PHR control element, the second MAC subheader including a second LCID, the second LCID indicating a bitmap in the second PHR control element, the bitmap including a plurality of bits for power headroom reports for a plurality of secondary cells; and
sending the second MAC subheader and the second PHR control element to the base station.

7. The non-transitory computer-readable medium of claim 6, wherein an order of the plurality of bits in the bitmap defines an order in which the power headroom reports for the plurality of secondary cells follow the bitmap.

8. The non-transitory computer-readable medium of claim 6, wherein the bitmap indicates a size of the second PHR control element.

9. The non-transitory computer-readable medium of claim 6, wherein at least one bit of the plurality of bits corresponds to a user equipment power headroom report.

10. The non-transitory computer-readable medium of claim 9, wherein other bits of the plurality of bits correspond to the power headroom reports for the plurality of secondary cells.

* * * * *